US009240044B2

(12) United States Patent
Okuda et al.

(10) Patent No.: US 9,240,044 B2
(45) Date of Patent: Jan. 19, 2016

(54) DRUG SOLUTION INSPECTION DEVICE AND DRUG SOLUTION INSPECTION METHOD

(71) Applicant: PANASONIC CORPORATION, Osaka (JP)

(72) Inventors: Akinobu Okuda, Nara (JP); Tamao Okamoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 279 days.

(21) Appl. No.: 13/927,542

(22) Filed: Jun. 26, 2013

(65) Prior Publication Data

US 2013/0343620 A1 Dec. 26, 2013

(30) Foreign Application Priority Data

Jun. 26, 2012 (JP) ................................. 2012-142638
May 27, 2013 (JP) ................................. 2013-110878

(51) Int. Cl.
G06K 9/00 (2006.01)
G06T 7/00 (2006.01)
G01F 23/02 (2006.01)

(52) U.S. Cl.
CPC .............. G06T 7/0012 (2013.01); G01F 23/02 (2013.01)

(58) Field of Classification Search
CPC ............................... G06T 7/0012; G01F 23/02
See application file for complete search history.

(56) References Cited

U.S. PATENT DOCUMENTS

| 5,928,197 | A | * | 7/1999 | Niehoff ........................ 604/155 |
| RE38,189 | E | * | 7/2003 | Walker et al. ................. 604/207 |
| 7,169,135 | B2 | * | 1/2007 | Duchon et al. ................ 604/246 |
| 8,073,238 | B2 | | 12/2011 | Nakanishi et al. |
| 8,381,581 | B2 | * | 2/2013 | Walsh et al. .................... 73/149 |
| 8,433,129 | B2 | | 4/2013 | Nakanishi et al. |
| 8,442,298 | B2 | | 5/2013 | Nakanishi et al. |
| 2001/0056258 | A1 | * | 12/2001 | Evans .......................... 604/131 |
| 2006/0144942 | A1 | * | 7/2006 | Evans et al. .................... 235/435 |
| 2009/0161941 | A1 | | 6/2009 | Nakanishi et al. |
| 2009/0188311 | A1 | * | 7/2009 | Cadieux et al. ................. 73/149 |
| 2010/0247513 | A1 | * | 9/2010 | Agee et al. ................. 424/94.67 |
| 2011/0276005 | A1 | * | 11/2011 | Hioki et al. ................... 604/187 |
| 2012/0105620 | A1 | | 5/2012 | Nakanishi et al. |
| 2012/0105621 | A1 | | 5/2012 | Nakanishi et al. |

FOREIGN PATENT DOCUMENTS

| JP | 2007-93465 | 4/2007 |
| JP | 2007-260390 | 10/2007 |

* cited by examiner

Primary Examiner — Tom Y Lu
(74) Attorney, Agent, or Firm — Wenderoth, Lind & Ponack, L.L.P.

(57) ABSTRACT

A drug solution inspection device includes a jig that mounts thereon a syringe containing a drug solution, an imaging unit that captures an image of the syringe mounted on the jig, an exposure unit that performs exposure on the syringe mounted on the jig, and a first control unit that controls the imaging unit and the exposure unit to acquire inspection information. In order to inspect an amount of the drug solution in the syringe, the first control unit transmits the captured image of the syringe while changing an exposure state of the exposure unit.

12 Claims, 20 Drawing Sheets

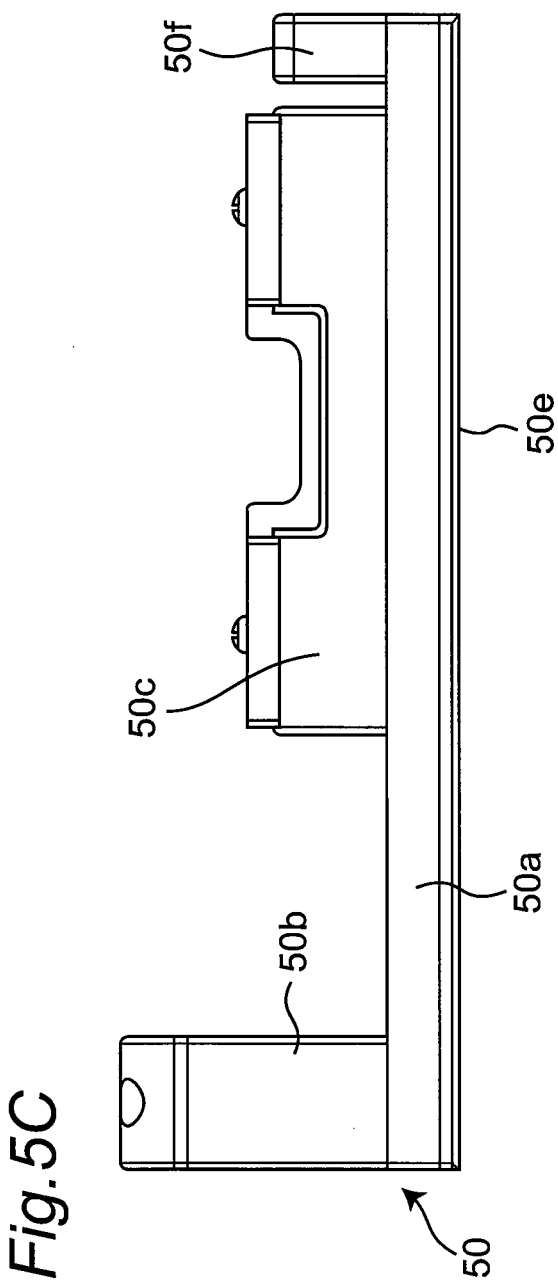

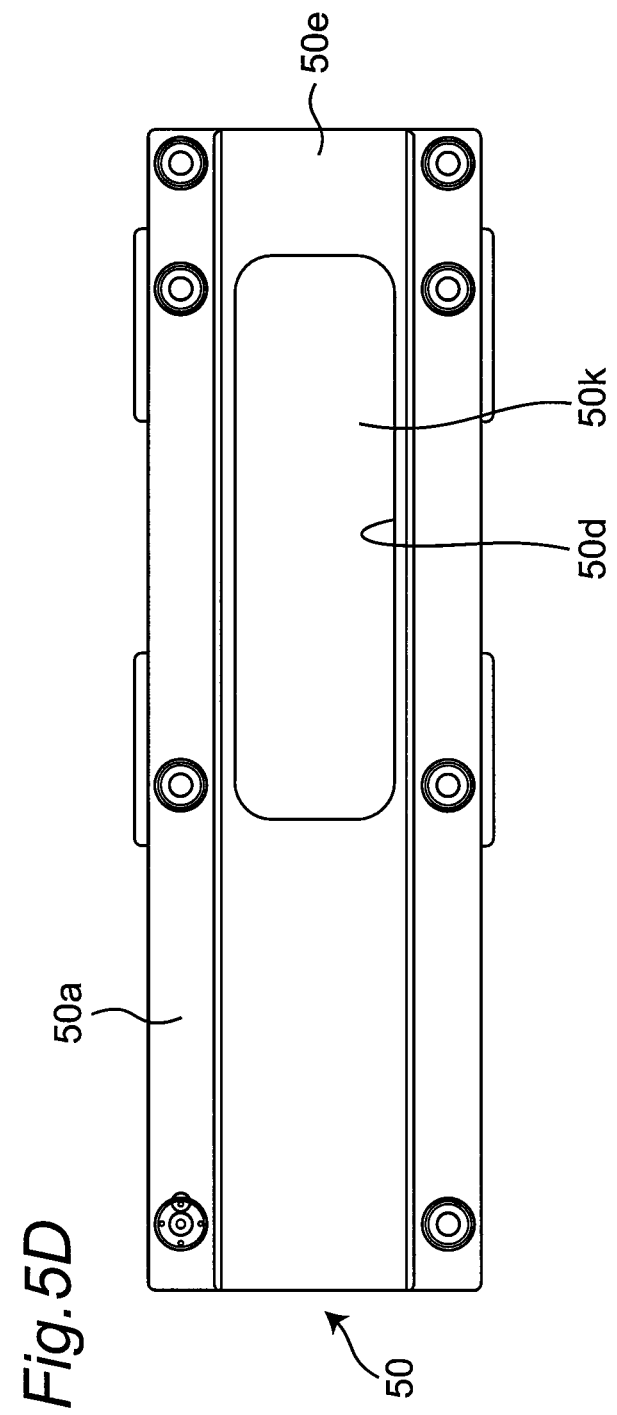

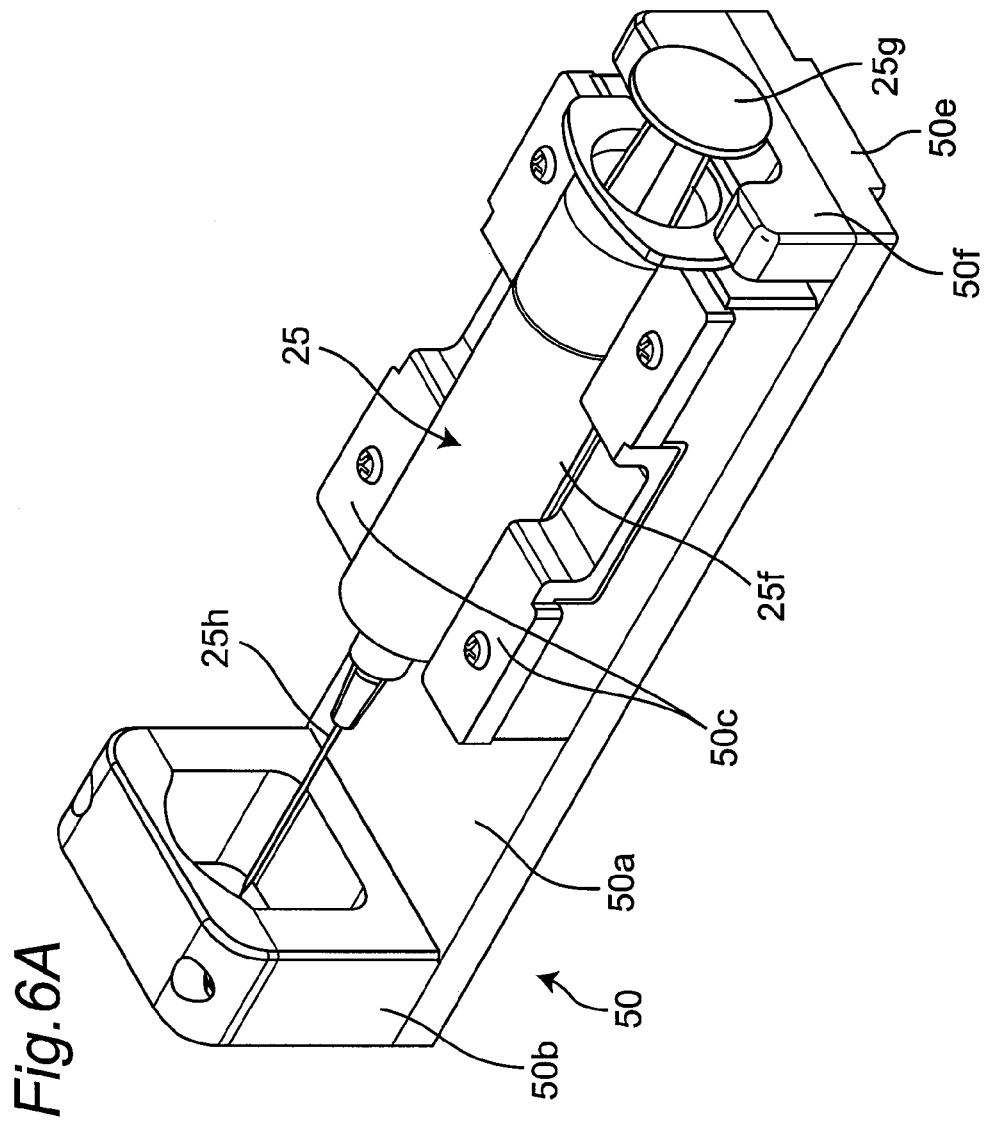

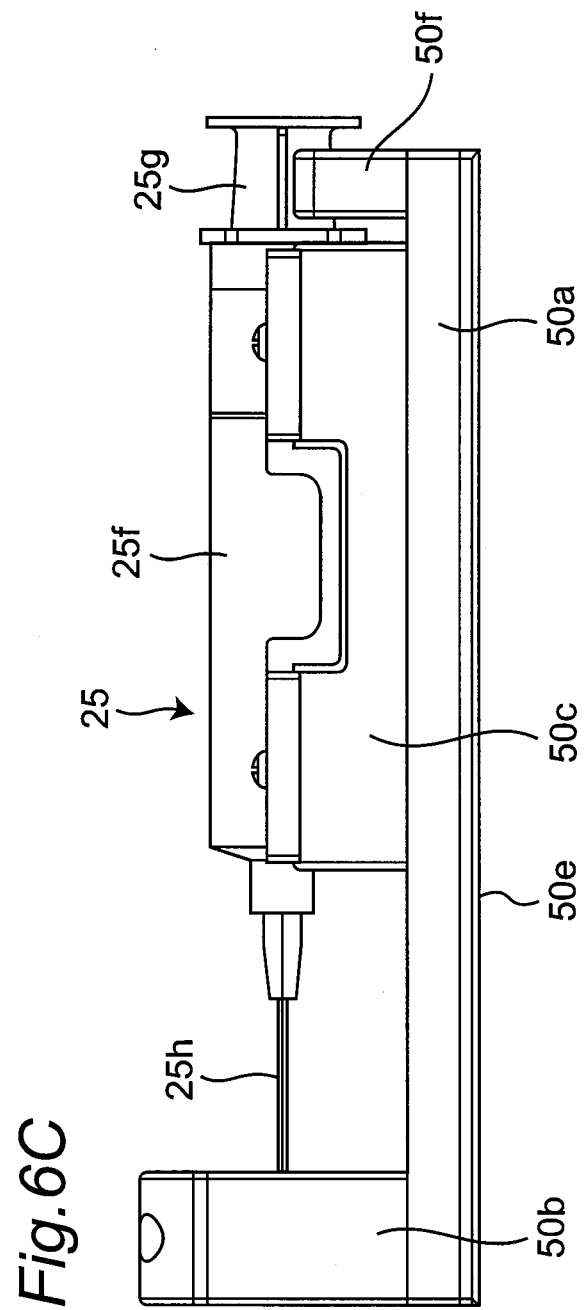

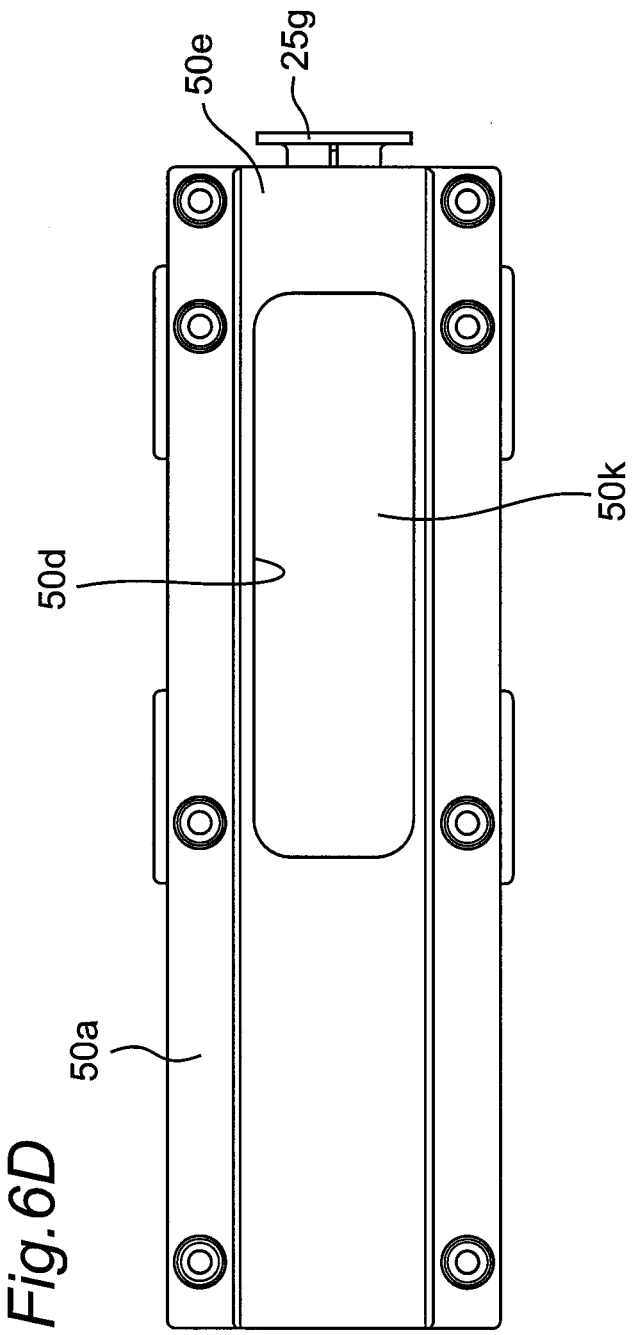

| SYRINGE CAPACITY(mL) | SYRINGE BODY DIAMETER(mm) |
|---|---|
| 2.5 | 9.5 |
| 5 | 14.2 |
| 10 | 17.7 |
| 20 | 21.8 |
| 30 | 26.2 |
| 50 | 31.3 |

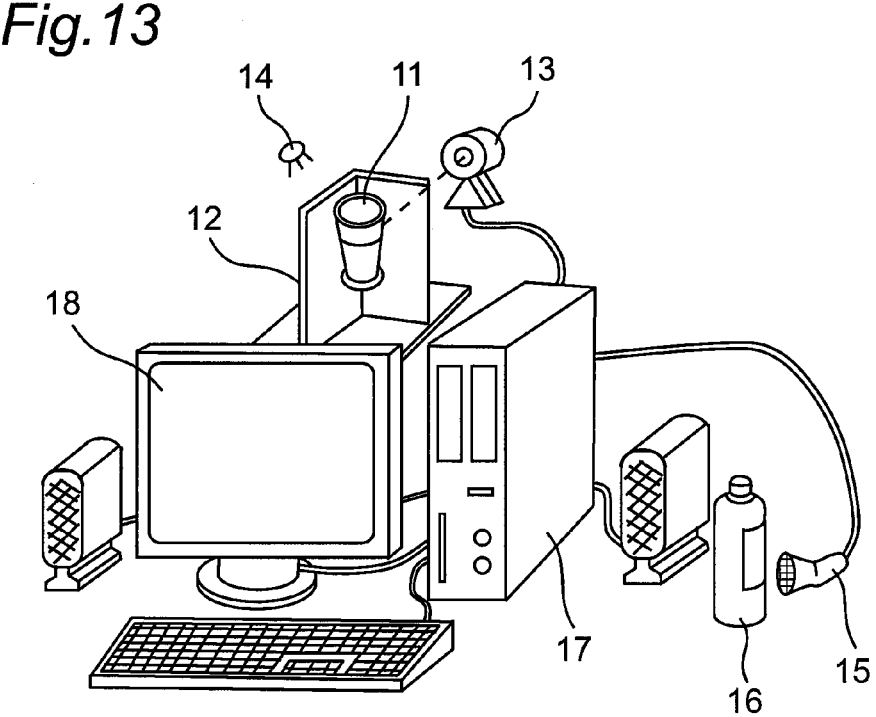

DRUG SOLUTION INSPECTION DEVICE AND DRUG SOLUTION INSPECTION METHOD

BACKGROUND OF THE INVENTION

The present invention relates to a drug solution inspection device and a drug solution inspection method, which are capable of inspecting, in a hospital and the like, an amount of a drug solution in a syringe as a work target at a place away from a worker.

In a hospital and the like, there is work of mixing and preparing an injection drug such as an anticancer drug (hereinafter, this work is referred to as mixed injection work).

In the case of performing the mixed injection work, it is necessary to safely manage this work, and also necessary for an inspector such as a pharmacist to inspect a series of work. Items to be inspected by the inspector include: items such as a dosage of the injection drug, which can be converted into numerical values; items such as a procedure of the mixed injection and as actions of the worker, which are difficult to be converted into numerical values; and the like. Therefore, in order to visually inspect the items which are difficult to be converted into numerical values, it is necessary for the inspector to stay close to the worker from the beginning to the end of the mixed injection work. Moreover, it is also frequent that one inspector inspects a plurality of pieces of mixed injection work performed at different places. With regard to such an inspection as described above, not only efficiency of the work has been poor, but also the inspection has been a large workload for the inspector.

Accordingly, there has been proposed a system which enables inspection at a place away from a site of the mixed injection work, and reduces the load on the inspector (for example, refer to JP 2007-260390 A).

FIG. 12 is a configuration view of a mixed injection inspection system of JP 2007-260390 A. The mixed injection inspection system shown in FIG. 12 is a system that allows the inspector to inspect mixed injection work using syringes (not shown). In each of preparation rooms 2 of a clean room 1 as a site of the mixed injection work, there are installed an imaging device 3 for capturing an image of the mixed injection work, and a display unit 7 on the worker's side. The display unit 7 displays, to the worker, contents which are inputted by an input device 6 of an inspection room 4. Moreover, the inspection room 4 for inspecting the mixed injection work is provided at a place away from the clean room 1. In the inspection room 4, there are installed a display unit 5 on the inspector's side, and the input device 6 for inputting an instruction issued from the inspector to the worker. The display unit 5 displays, to the inspector, the image of the mixed injection work captured by the imaging device 3.

With such a configuration, for such mixed injection work by a plurality of the workers in a plurality of the preparation rooms 2, the mixed injection inspection system of JP 2007-260390 A enables one inspector to issue precise instructions to the individual workers from one inspection room 4, and to inspect a series of the mixed injection work. As described above, the inspector performs inspection work at a place away from the site of the mixed injection work, whereby work efficiency thereof can be enhanced, and the load on the inspector can be reduced.

Meanwhile, there has been proposed a drug solution inspection system for accurately observing an amount of a drug solution for use in the mixed injection (for example, refer to JP 2007-93465 A).

FIG. 13 is a configuration view of the drug solution inspection system of JP 2007-93465 A. In the inspection system shown in FIG. 13, in order to accurately read a liquid level of a drug solution in a measuring device 11, the measuring device 11 is vertically positioned in front of a camera 13 by a calibration unit 12. Then, an image of a vicinity of the liquid level of the drug solution in the measuring device 11 is captured together with a scale of the measuring device 11 by the camera 13. Moreover, in order that the vicinity of the liquid level of the drug solution can be clearly seen, the measuring device 11 is irradiated with illumination light by an illumination unit 14. Furthermore, a type of a drug solution 16 and the captured image are associated with each other by an identifying unit 15, and are stored in a personal computer 17, and information is displayed on a monitor 18.

However, in the mixed injection inspection system of JP 2007-260390 A, if general interior illumination or natural light is used at the time of capturing the image of the injection drug in the syringe (not shown), the inspection work cannot be performed in some cases since an accurate amount of the injection drug cannot be grasped. Specifically, for example, when the syringe contains an injection drug with a dark color, a gasket of the syringe and the injection drug with a dark color may be assimilated with each other chromatically, and a position of the gasket of the syringe cannot be grasped only by observing the image captured by the imaging device 3, and it is difficult to grasp the amount of the injection drug.

Here, there is assumed a case of using the drug solution inspection system of JP 2007-93465 A in order to grasp the accurate amount of the injection drug. The illumination section 14 of the drug solution inspection system of JP 2007-93465 A corrects brightness of a place where the measuring device 11 is placed, and solves a shortage of a quantity of the illumination light in the vicinity of the liquid level of the drug solution. Hence, even in the case of using the drug solution inspection system of JP 2007-93465 A, if the syringe is used as the measuring device 11, the gasket of the syringe and the drug solution with a dark color may be assimilated with each other chromatically, and it is difficult to grasp the accurate amount of the drug solution only by observing the image captured by the camera 13. Therefore, even in the case of using the drug solution inspection system of JP 2007-93465 A for the mixed injection inspection system of JP 2007-260390 A, it is difficult to grasp the amount of the drug solution.

SUMMARY OF THE INVENTION

The present invention solves this problem. It is an object of the present invention to provide a drug solution inspection device and a drug solution inspection method, which are capable of grasping an accurate amount of a drug solution even if the drug solution has a dark color, and capable of performing accurate inspection.

In order to achieve the foregoing object, a drug solution inspection device according to an aspect of the present invention is characterized in that in a drug solution inspection device which captures an image of a syringe that contains a drug solution and inspects an amount of the drug solution in the syringe, the device comprising:

an imaging unit that captures an image of the syringe mounted on a jig;

an exposure unit that performs exposure on the syringe mounted on the jig; and a first control unit that controls the imaging unit and the exposure unit to acquire inspection information of the drug solution, wherein the jig has a transmitting portion provided in a region having a width substantially equal to a width of a cylinder of the syringe and at least including the cylinder of the syringe mounted thereon when viewed from above, and the first control unit transmits, as inspection information, information of the captured image of the syringe in a state where the syringe is exposed by the exposure unit through the transmitting portion, to inspect the amount of the drug solution in the syringe.

In order to achieve the foregoing object, a drug solution inspection device according to another aspect of the present invention is characterized in that in a drug solution inspection device which captures an image of a syringe that contains a drug solution and inspects an amount of the drug solution in the syringe, the device comprising:

an imaging unit that captures an image of the syringe mounted on a jig;

an exposure unit that performs exposure on the syringe mounted on the jig; and a first control unit that controls the imaging unit and the exposure unit to acquire inspection information, wherein the first control unit transmits information of the captured image of the syringe in a state where the exposure unit is controlled to expose only a region having a width substantially equal to a width of a cylinder of the syringe and at least including the cylinder of the syringe, to inspect the amount of the drug solution in the syringe.

Moreover, in order to achieve the foregoing object, a drug solution inspection method according to the present invention is characterized in that in a drug solution inspection method which captures an image of a syringe that contains a drug solution and inspects an amount of the drug solution in the syringe, the method comprising:

capturing an image of the syringe by an imaging unit in a state where the syringe is irradiated with light having a width substantially equal to a width of a cylinder of the syringe; and transmitting information of the captured image as inspection information to inspect an amount of the drug solution in the syringe.

In accordance with the aspects of the present invention, even if the drug solution has a dark color, a contrivance is made to the illumination for exposure on the syringe, whereby a boundary between the gasket of the syringe and the drug solution can be made clear, the position of the gasket can be reliably read, the accurate amount of the drug solution can be grasped, and the accurate inspection can be thereby carried out.

BRIEF DESCRIPTION OF THE DRAWINGS

These and other aspects and features of the present invention will become clear from the following description taken in conjunction with the preferred embodiments thereof with reference to the accompanying drawings, in which:

FIG. 5C is a front view of the jig of the drug solution inspection device;

FIG. 5D is a bottom view of the jig of the drug solution inspection device;

FIG. 6A is a perspective view of a state where the syringe is mounted on the jig of the drug solution inspection device;

FIG. 6C is a front view of the state where the syringe is mounted on the jig of the drug solution inspection device;

FIG. 6D is a bottom view of the state where the syringe is mounted on the jig of the drug solution inspection device;

FIG. 13 is a configuration view of a drug solution inspection system of JP 2007-93465 A.

DESCRIPTION OF THE PREFERRED EMBODIMENTS

Figure 1:
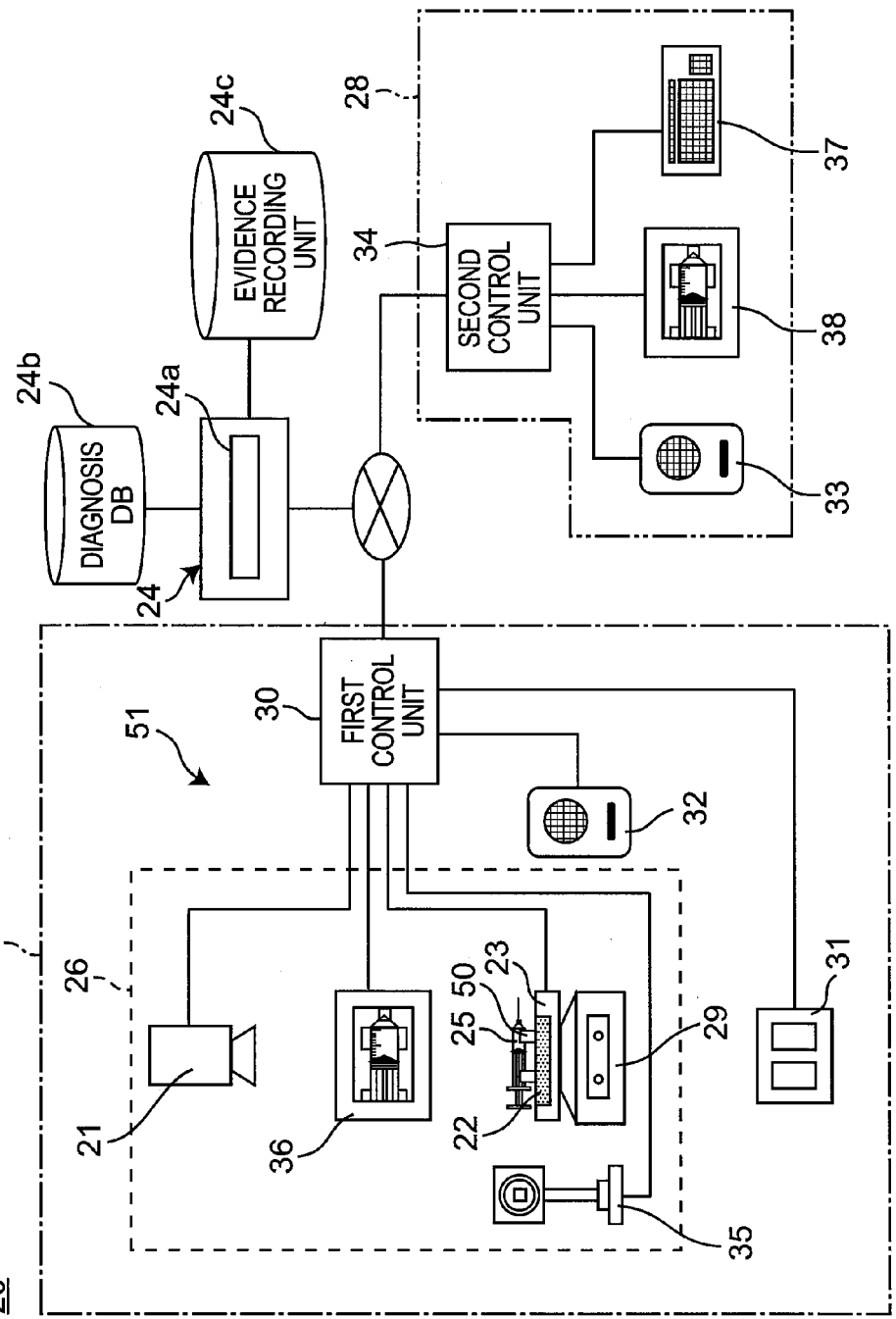
FIG. 1 is a schematic configuration view of a drug solution inspection system including a drug solution inspection device according to a first embodiment of the present invention.

A description is made below of embodiments of the present invention while referring to the drawings. Note that the same reference numerals are denoted to the same components, and a description thereof is sometimes omitted. The drawings mainly and schematically show the respective components for the purpose of facilitating the understanding.

(First Embodiment)

Figure 2:
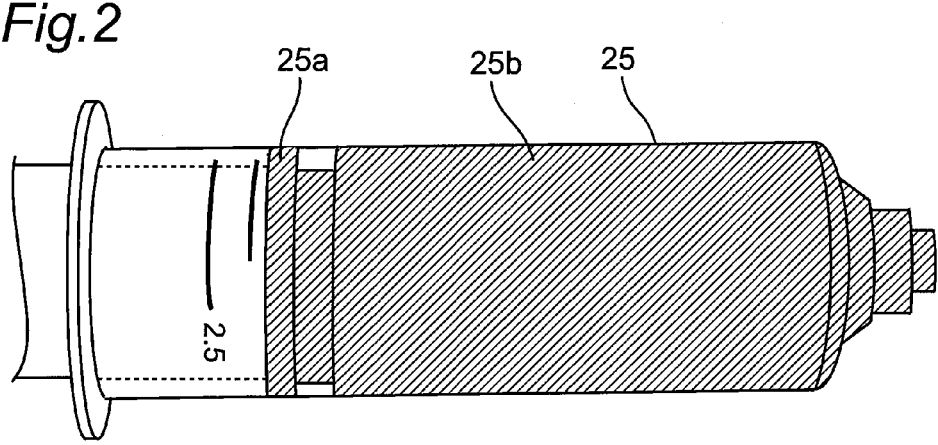
FIG. 2 is a plan view in a case of inspecting an amount of a drug solution inside a syringe by a normal inspection base.
Figure 3:
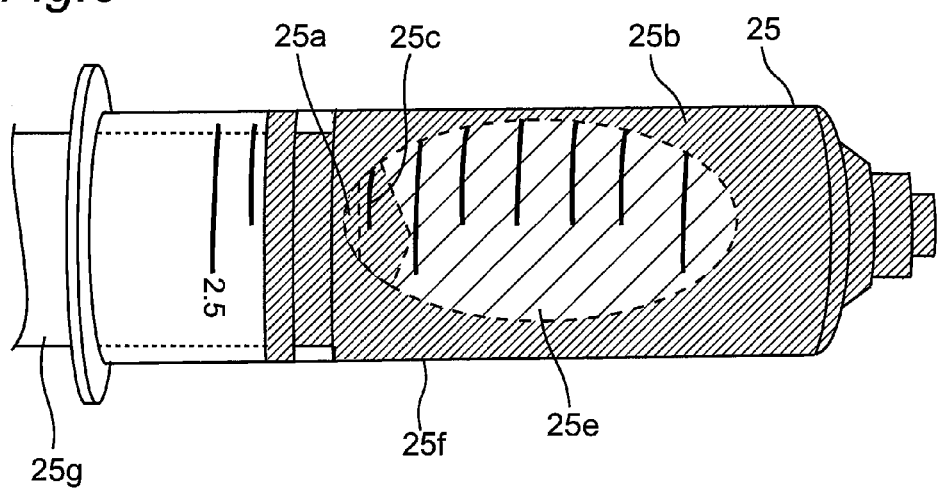
FIG. 3 is a plan view in a case of inspecting the amount of the drug solution inside the syringe by the drug solution inspection system according to the first embodiment of the present invention.

FIG. 1 is a configuration view schematically showing a drug solution inspection system 20 including a drug solution inspection device 51 according to a first embodiment of the present invention. FIG. 2 is a plan view of a case of inspecting an amount of a drug solution 25b in a syringe 25 by a normal inspection base. FIG. 3 is a plan view of a case of inspecting the amount of the drug solution 25b inside the syringe 25 by the drug solution inspection system 20 according to the first embodiment of the present invention. The drug solution is an example of a drug, and for example, is an injection drug. The drug solution inspection system 20 of the first embodiment is an injection drug inspection system for performing preparation and inspection of the injection drug, for example.

The drug solution inspection system 20 of the first embodiment includes at least: an imaging unit 21; an exposure unit 22; a jig 50; and a first control unit 30. Moreover, the drug solution inspection device 51 is configured by the imaging unit 21, the exposure unit 22, the jig 50, and the first control unit 30. The first control unit 30 is an example of a control unit on the preparation side.

In the drug solution inspection system 20 of the first embodiment, the amount of the drug solution 25b in the syringe 25 fixed to the jig 50 is inspected in a state where the syringe 25 is placed on an inspection base 23 in a workroom 27. The workroom 27 is, for example, a clean room for performing mixed injection work. At this time, if the syringe 25 contains the drug solution 25b with a dark color, such as a blackish drug, it is difficult to read a position of a scale 25c of a gasket 25a, as shown in FIG. 2, by only placing the syringe 25 on the inspection base 23 through the jig 50. This is believed to be because a tip end portion of the gasket 25a of the syringe 25 and the drug solution 25b with a dark color are assimilated with each other chromatically, and a boundary between the gasket 25a and the drug solution 25b cannot be identified. Note that, normally, the gasket 25a is a member constituted by rubber and the like and has a light blocking effect.

Accordingly, a first feature of the drug solution inspection device 51 of the first embodiment is that the drug solution inspection device 51 performs exposure from below on a region which includes at least the gasket 25a of the syringe 25, by using the exposure unit 22 in a state where the exposure unit 22 is arranged on the inspection base 23, and the syringe 25 is supported on the exposure unit 22 through the jig 50.

At least a part of the syringe 25 is exposed by the exposure unit 22 through the jig 50, and an image thereof is captured by the imaging unit 21, whereby the boundary between the gasket 25a and the drug solution 25b can be made clear. This is believed to be because, an apparent color of the drug solution 25b is changed by exposing at least a part of the syringe 25 through the jig 50, and an exposed bright exposure region 25e is formed on the captured image as shown in FIG. 3. Then, as a result, the scale 25c of the syringe 25 for grasping the amount of the drug solution 25b becomes clearly identifiable.

The drug solution inspection system 20 of the first embodiment transmits, the captured image acquired as described above, to an inspection room 28 through the first control unit 30 from the imaging unit 21 of the workroom 27, whereby an inspector in the inspection room 28 can perform inspection work for mixed injection work performed in the workroom 27.

A description is made of a configuration of the entire drug solution inspection system 20 of the first embodiment.

As shown in FIG. 1, the drug solution inspection system 20 of the first embodiment is configured by a server 24, the workroom 27, and the inspection room 28.

The server 24 manages a preparation DB (preparation database) 24a regarding the drug solution 25b. The server 24 is connected to a diagnosis DB (diagnosis database) 24b and an evidence recording unit 24c.

A safety cabinet 26 is arranged in the workroom 27. Inside the safety cabinet 26, there are arranged the imaging unit 21, the exposure unit 22, the inspection base 23, a measuring unit 29, an identifying unit 35, and a first display unit 36.

Above the inspection base 23, the imaging unit 21 is arranged downward at a position where an image of the syringe 25 supported on the inspection base 23 through the jig 50 can be captured. By control of the first control unit 30, the imaging unit 21 captures the image of the syringe 25 that sucks or discharges the drug solution 25b (refer to FIG. 2).

Figure 4:
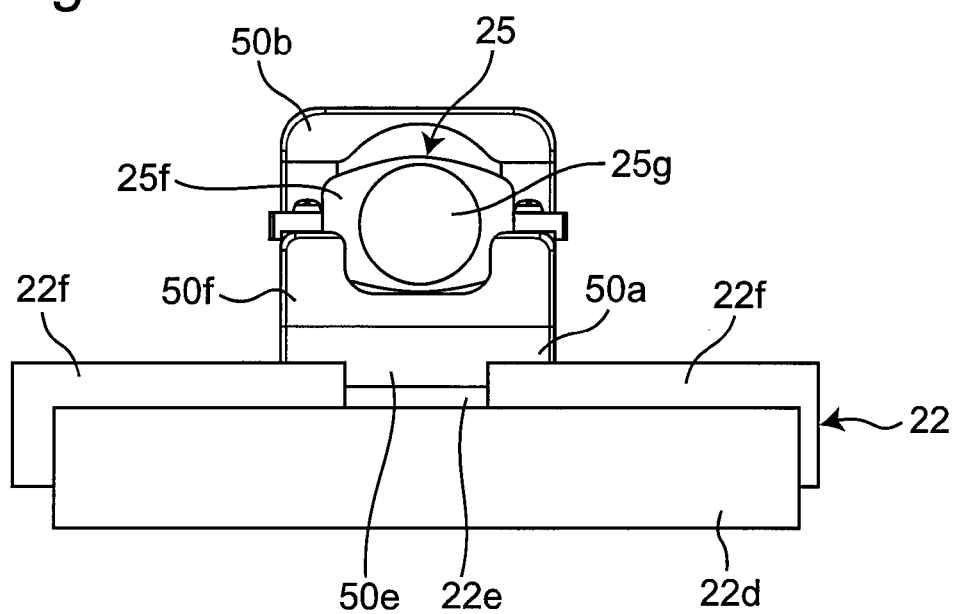
FIG. 4 is an explanatory view of an engaged state between an exposure unit and a jig of the drug solution inspection device.
Figure 5A:
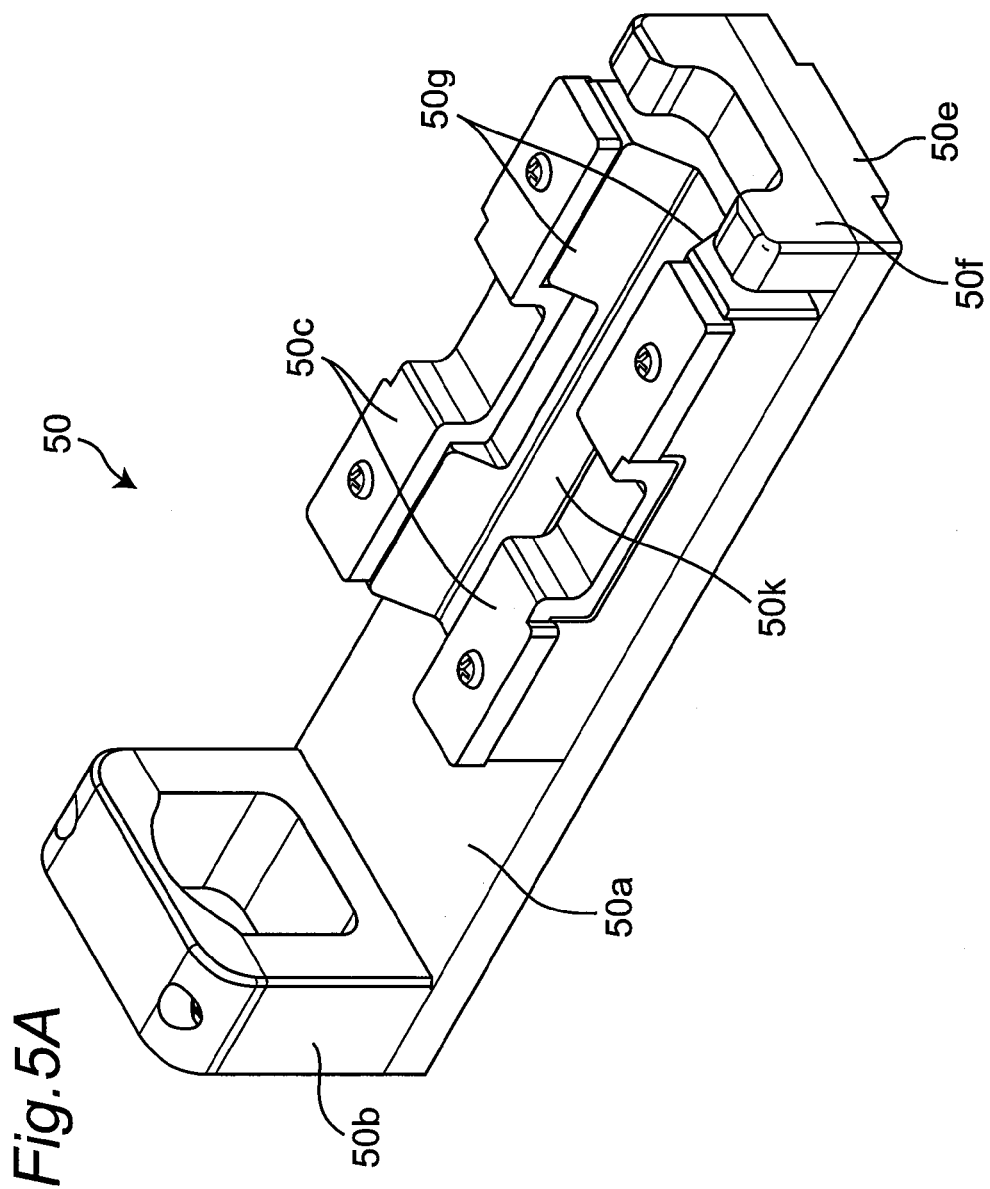
FIG. 5A is a perspective view of the jig of the drug solution inspection device.
Figure 5B:
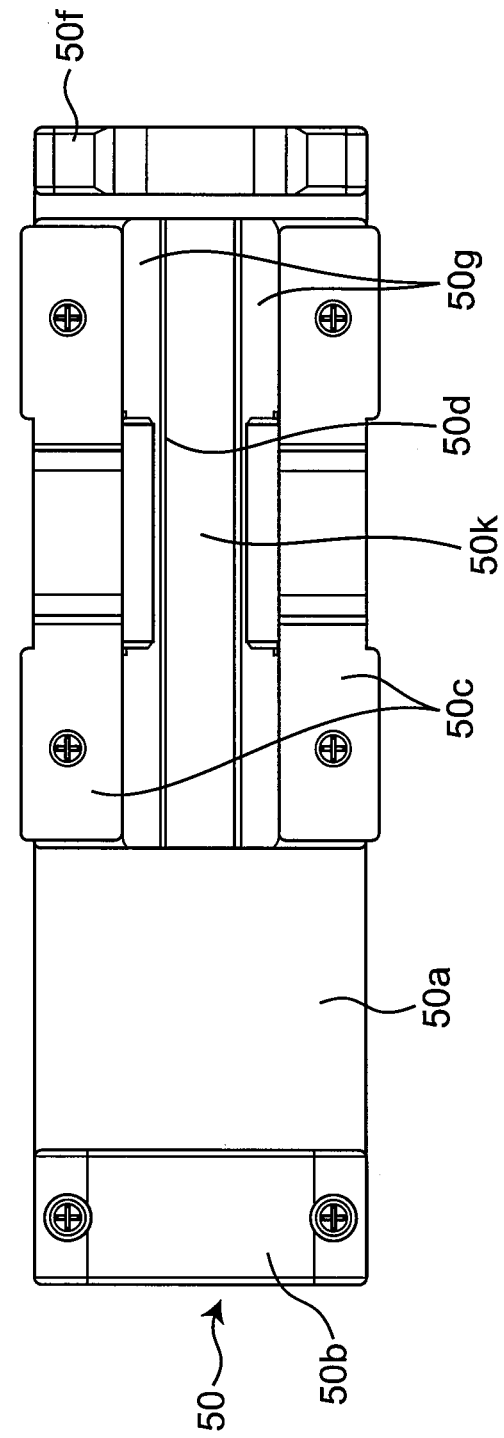
FIG. 5B is a plan view of the jig of the drug solution inspection device.
Figure 5E:
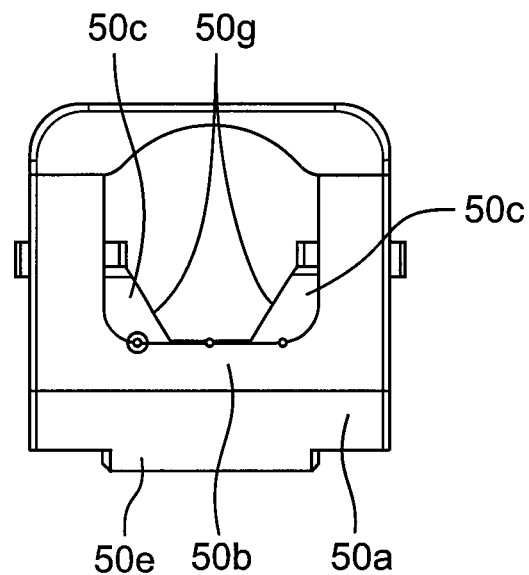
FIG. 5E is a left side view of the jig of the drug solution inspection device.
Figure 5F:
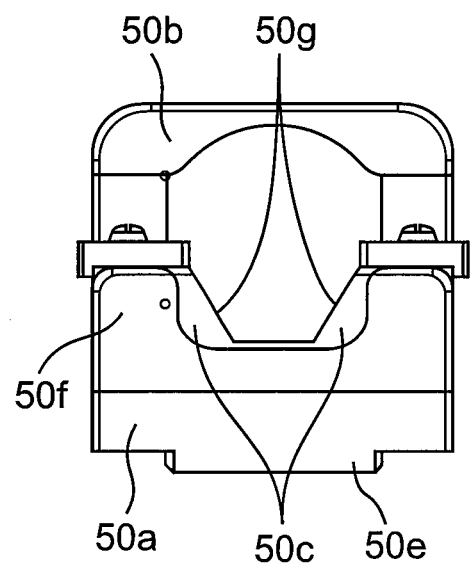
FIG. 5F is a right side view of the jig of the drug solution inspection device.
Figure 6B:
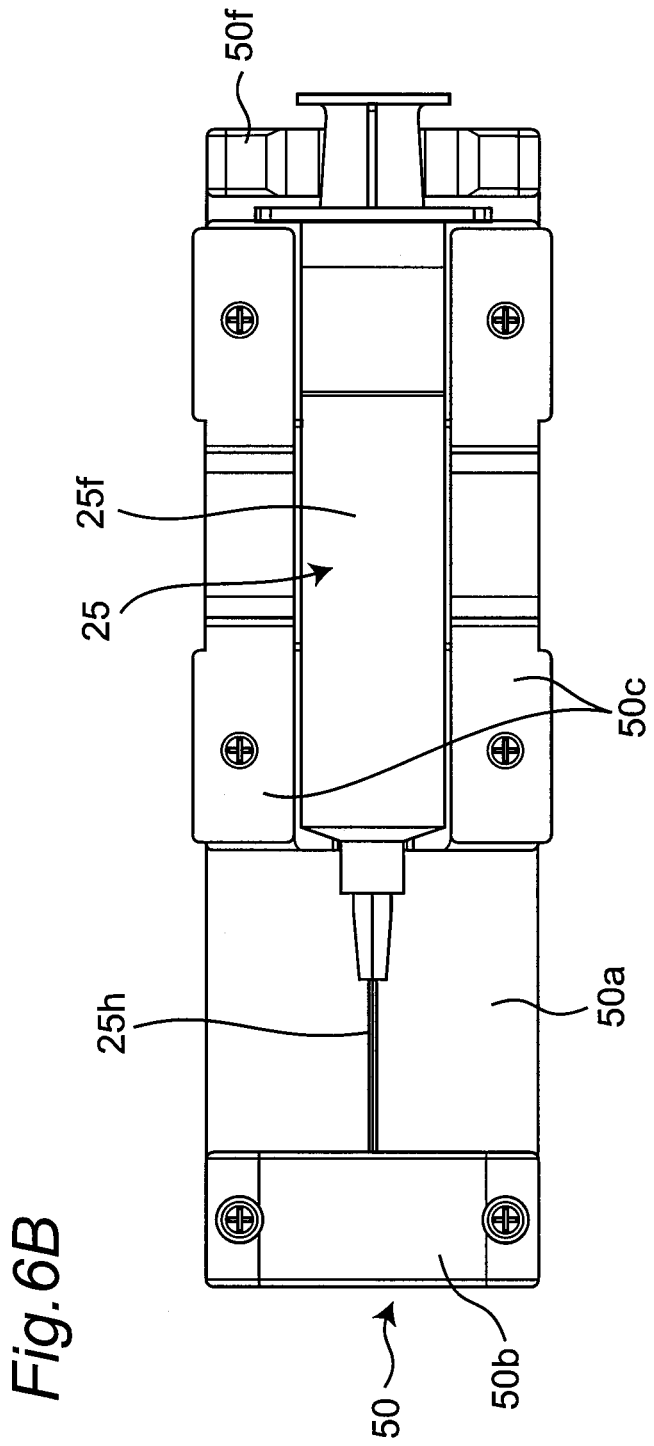
FIG. 6B is a plan view of the state where the syringe is mounted on the jig of the drug solution inspection device.
Figure 6E:
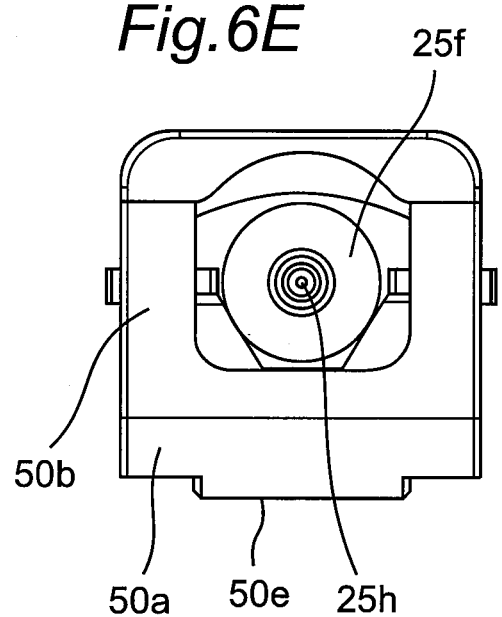
FIG. 6E is a left side view of the state where the syringe is mounted on the jig of the drug solution inspection device.
Figure 6F:
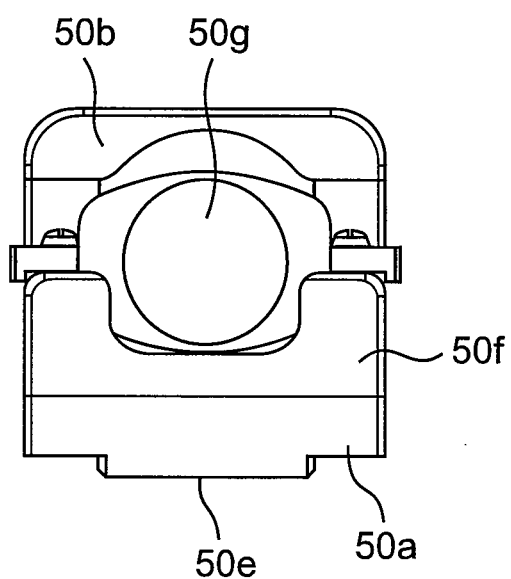
FIG. 6F is a right side view of the state where the syringe is mounted on the jig of the drug solution inspection device.

As shown in FIG. 4, the exposure unit 22 is configured by a light source 22d, and light shielding covers 22f which have a light transmitting region 22e therebetween. The light shielding covers 22f are arranged on the light source 22d so as to cover an upper surface of the light source 22d. Light from the light source 22d passes through only the light transmitting region 22e, and a part of the syringe 25 is exposed from below. Portions other than the light transmitting region 22e are shielded by the light shielding covers 22f, and therefore, do not transmit therethrough the light from the light source 22d. The light transmitting region 22e is formed as a rectangular engagement recess on a center upper surface of the light source 22d in a width direction, and has a width equal to or more than a width of an opening portion 50d of the jig 50. The engagement recess as the light transmitting region 22e is formed, for example, into a linear band shape extending along a longitudinal direction of the light source 22d. The exposure unit 22 is arranged at a position facing the imaging unit 21 with the syringe 25 and the jig 50 therebetween. For example, the light source 22d of the exposure unit 22 is an LED illumination device. In the case of using the LED illumination device as the light source 22d of the exposure unit 22, even if the drug solution is a drug prone to be degraded by light, the drug solution can be exposed with a specific wavelength at which such degradation of the drug is less likely to occur. Moreover, heat generation of the LED illumination device is smaller as compared with those of other light sources, and deformation of the drug due to heat is also less likely to occur.

A second feature of the drug solution inspection device 51 of the first embodiment is that the drug solution inspection device 51 uses the light shielding covers 22f, and arranges the jig 50 on the exposure unit 22 to expose only a range substantially equal to a width of a cylinder 25f.

FIG. 5A to FIG. 5F are a perspective view, a plan view, a front view, a bottom view, a left side view, and a right side view of the jig 50, respectively. FIG. 6A to FIG. 6F are a perspective view, a plan view, a front view, a bottom view, a left side view, and a right side view of a state where syringe 25 is mounted on the jig 50.

As shown in FIG. 5A to FIG. 6F, the jig 50 has: a rectangular bottom plate portion 50a; a tip end cover 50b; a pair of side portions 50c; a rear end protrusion 50f; and a transparent member 50k.

The bottom plate portion 50a has an opening portion 50d in a region including at least the cylinder 25f of the syringe 25 when viewed from above. The opening portion 50d is a rectangular through hole along a longitudinal direction of the bottom plate portion 50a. A width and a length of the opening portion 50d are substantially equal to a width and a length of the cylinder 25f which is a cylindrical portion of the syringe 25. In the first embodiment, by making the width and the length of the opening portion 50d substantially equal to the width and the length of the cylinder 25f, light is radiated from the opening portion 50d so that unnecessary light does not enter the imaging unit 21, and visibility of the cylinder 25f can be enhanced. The bottom plate portion 50a of the first embodiment is configured such that the light from the light source 22d of the exposure unit 22 arranged below the opening portion 50d can transmit therethrough toward the cylinder 25f. As such a configuration, for example, the opening portion 50d has a configuration in which a rectangular through hole is provided along the longitudinal direction of the bottom plate portion 50a, or a configuration in which the transparent member 50k is fitted and arranged in the opening portion 50d as shown in FIG. 5A to FIG. 6F. In the first embodiment, the opening portion 50d as the through hole and the transparent member 50k provided in the opening portion 50d are collectively referred to as a transmitting portion. As shown in FIG. 5A to FIG. 6F, in the case of forming the transparent member 50k and the side portions 50c as one member, a cover only needs to be provided on the transparent side portions 50c, and the like.

The tip end cover 50b is arranged so as to be erected on a tip end of the bottom plate portion 50a in the longitudinal direction, and covers a tip end of a needle 25h of the syringe 25. The tip end cover 50b covers the tip end of the needle 25h, and thereby prevents a worker from erroneously touching the tip end of the needle 25h.

A pair of side portions 50c are arranged along the longitudinal direction of the bottom plate portion 50a so as to be erected on both sides thereof with the opening portion 50d therebetween. The pair of side portions 50c make contact with side portions of the syringe 25 from both sides to sandwich the side surfaces of the syringe 25. On inner surfaces of the pair of side portions 50c, which are opposite to each other, there are respectively formed inclined surfaces 50g which make contact with an outer circumferential surface of the syringe 25 and perform position regulation for a lateral direction of the syringe 25.

The rear end protrusion 50f sandwiches a flange on a rear portion of the syringe 25, and prevents deviation and drop of the syringe 25 in an axial direction.

Moreover, on a back surface of the bottom plate portion 50a, there is formed an engagement protrusion 50e having a rectangular linear band shape, which extends along the longitudinal direction at a center portion in a width direction of the bottom plate portion 50a and protrudes downward. The engagement protrusion 50e engages with the light transmitting region 22e that functions as the engagement recess, and regulates the jig 50 so that the jig 50 is freely movable in the longitudinal direction and is not positionally shifted in the lateral direction. By using, as a rail, the engagement recess (light transmitting region 22e) engaged with the engagement protrusion 50e, the jig 50 is slidable in the longitudinal direction with respect to the exposure unit 22. Accordingly, the jig 50 can be adjusted so that the region including at least a part of the gasket 25a of the syringe 25 is located within an imaging range of the imaging unit 21.

Figures 7A, 7B:
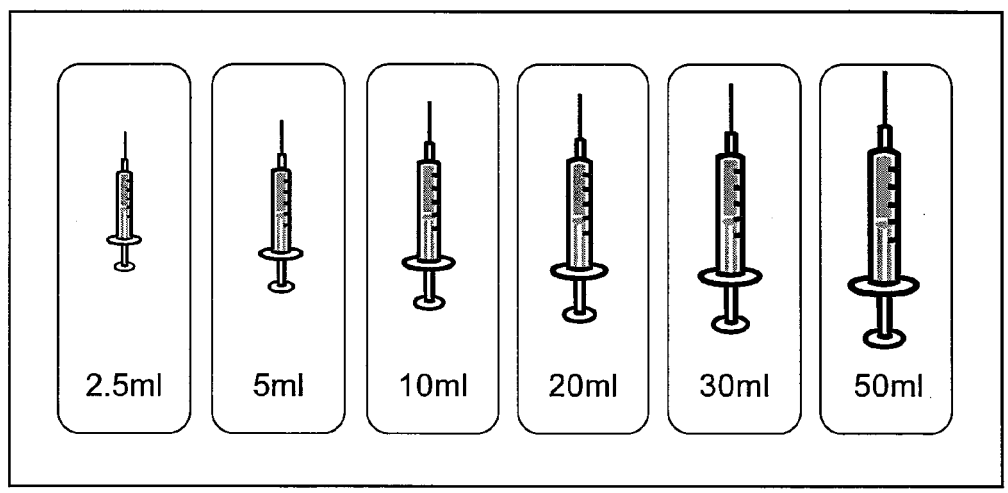
FIG. 7A is a table-format view showing an example of a relationship between a capacity and a width (body diameter) of the syringe.
FIG. 7B is a view of a screen showing an input operation region of a touch panel of the drug solution inspection device, the input operation region for selecting a type of the syringe.

Furthermore, when a type of the syringe 25 is changed, a width (body diameter) of the cylinder 25f of the syringe 25 is also changed according to a capacity of the syringe 25, as shown in FIG. 7A. Therefore, when the type of the syringe 25 is changed, it is necessary to exchange the jig 50 with those corresponding to a plurality of types of the cylinder 25f of the syringe 25. At this time, an interval between the pair of side portions 50c is also changed, and the width or the length of the opening portion 50d of the bottom plate portion 50a is also changed. However, in the first embodiment, since it is possible to change the width of the opening portion 50d, the width of the engagement protrusion 50e can always be made constant. Therefore, a configuration including the engagement recess (light transmitting region 22e) of the exposure unit 22 and the engagement protrusion 50e of the jig 50 can support all of the syringes 25. By using such a jig 50, remote inspection work for the syringe 25 can be performed easily and accurately.

Here, in order to allow the width dimension of the opening portion 50d to correspond to the width dimension of the cylinder 25f of the syringe 25 for the purpose of realizing the second feature of the first embodiment, the width is adjusted by exchanging the jig 50 with a jig 50 having an opening portion 50d with another width dimension. As a more specific example, a jig 50 having an opening portion 50d with a dimension corresponding to a width of a syringe with a capacity of 2.5 ml is prepared for the syringe with a capacity of 2.5 ml with reference to FIG. 7A. For a syringe with a capacity of 5 ml, a jig 50 having an opening portion 50d with a dimension corresponding to a width of the syringe with a capacity of 5 ml is prepared. For a syringe with a capacity of 10 ml, a jig 50 having an opening portion 50d with a dimension corresponding to a width of the syringe with a capacity of 10 ml is prepared. For a syringe with a capacity of 20 ml, a jig 50 having an opening portion 50d with a dimension corresponding to a width of the syringe with a capacity of 20 ml is prepared. For a syringe with a capacity of 30 ml, a jig 50 having an opening portion 50d with a dimension corresponding to a width of the syringe with a capacity of 30 ml is prepared. For a syringe with a capacity of 50 ml, a jig 50 having an opening portion 50d with a dimension corresponding to a width of the syringe with a capacity of 50 ml is prepared. In this manner, in correspondence with the capacities of the six types of syringes shown in FIG. 7A, six types of the jigs for the six types of syringes are prepared. Moreover, in the case where the shape of the opening portion 50d is also always set constant, the transparent member 50k to be fitted to the opening portion 50d is partially changed to a light shielding member, whereby it is possible to change the width of the transparent region in the opening portion 50d.

Moreover, in another mode of realizing the second feature of the first embodiment, it is also possible to adjust the width by changing a width of the light transmitting region 22e between the light shielding covers 22f.

Moreover, in still another mode of realizing the second feature of the first embodiment, the light source 22d can be configured by a large number of LED light emitting elements, and an illumination width (light emitting width) can be changed on the light source 22d side. Among the large number of LED light emitting elements, if elements to emit light are controlled, the illumination width can be changed with ease. As a method of changing the illumination width (light emitting width) on the light source 22d side, for example, an input operation screen as shown in FIG. 7B is displayed on a touch panel as an example of the first display unit 36, and the worker selects and inputs the type of the syringe on the screen of the first display unit 36. For example, with reference to FIG. 7A and FIG. 7B, for the syringe with a capacity of 2.5 ml, an icon of 2.5 ml on a left end of FIG. 7B is pushed, and a light emitting portion 22b is allowed to emit light with a width of the syringe with a capacity of 2.5 ml. Similarly, for the syringes with capacities of 5 ml, 10 ml, 20 ml, 30 ml, and 50 ml, icons corresponding to the respective syringe capacities are pushed, whereby the light emitting portion 22b is allowed to emit light with widths of the respective syringes. In this manner, it is possible to support six types of syringes shown in FIG. 7A.

The syringe 25 is mounted on the inspection base 23 via the exposure unit 22 and the jig 50. In order to miniaturize a configuration of the inspection base 23, the inspection base 23 includes the exposure unit 22 in a recess formed in an upper portion thereof as shown in FIG. 1.

The measuring unit 29 is arranged below the inspection base 23 and measures weight of the syringe 25. The worker not only visually inspects the amount of the drug solution 25b by reading the scale of the syringe 25, but also measures the amount of the drug solution 25b by the measuring unit 29, whereby a more accurate amount can be calculated. For example, the weight of the syringe 25 that does not contain the drug solution 25b is measured in advance, and thereafter, the weight of the syringe 25 that contains the drug solution 25b subjected to the mixed injection is measured, and a difference therebetween is calculated, whereby the accurate amount of the drug solution 25b can be obtained. Here, the mixed injection refers to mixing preparation of the drug solution 25b (injection drug), and the first embodiment is described by using the term of mixed injection or preparation, both of which are defined to have the same meaning.

The identifying unit 35 has a function to identify information of a prescription and the type of the drug solution 25b. For example, the identifying unit 35 reads a bar code of the prescription or a drug container, makes an inquiry to the preparation DB 24a or the diagnosis DB 24b of the server 24, and acquires the information of the prescription or information of the drug solution from the preparation DB 24a or the diagnosis DB 24b. The information of the prescription and the type of the drug solution 25b identified by the identifying unit 35 and an inspection image of the syringe 25 captured by the imaging unit 21 are associated with each other by the first control unit 30 described later, and are stored in the evidence recording unit 24c of the server 24 by the first control unit 30. In this manner, information regarding a series of mixed injection work for the drug solution 25b (injection drug) can be recorded. Accordingly, traceability of the mixed injection work and the inspection work for the injection drug is ensured, and investigation or reference after the work is enabled.

The first display unit 36 is arranged inside the safety cabinet 26 or in the vicinity thereof, and displays the captured image and an inspection instruction or an inspection result from the inspector. With the first display unit 36, the worker can confirm the inspection instruction or the inspection result from the inspector, and can perform accurate mixed injection work or inspection work.

Inside the workroom 27 including the safety cabinet 26, the first control unit 30, a first input unit 31, and a first communicating unit 32 are arranged in addition to the safety cabinet 26.

The first control unit 30 controls the respective operations, i.e., an imaging operation of the imaging unit 21; an exposing operation of the exposure unit 22; and an identifying operation of the identifying unit 35. Moreover, the first control unit 30 acquires information of the captured image of the syringe 25 from the imaging unit 21, and transmits the acquired information to a second control unit 34 to inspect the amount of the drug solution 25b in the syringe 25. The second control unit 34 is an example of a control unit on an inspection side.

The first input unit 31 is a unit for inputting instructions for operating the imaging unit 21 and the exposure unit 22 through the first control unit 30. The first input unit 31 is an example of an input unit on the preparation side. The first input unit 31 is, for example, a foot switch. By using the foot switch as the first input unit 31, the worker in the workroom 27 can make an inspection request to the inspector or a necessary operation for the inspection (for example, change of an exposure state of the exposure unit 22, and the like) without releasing his or her hand from the syringe 25 during work. Accordingly, not only work efficiency of the worker is enhanced, but also it is unnecessary to input the instruction by taking the hand out from the safety cabinet 26 during work.

That is, an input section such as the foot switch which does not use hand is used as the first input unit 31, whereby components directly necessary for the mixed injection of the drug solution 25b can be arranged inside the safety cabinet 26, and the worker can stay in the vicinity of the safety cabinet 26 and operate the imaging unit 21, the exposure unit 22, and the like necessary for the mixed injection of the drug solution 25b from an outside of the safety cabinet 26. Note that the first input unit 31 may also be configured to include at least any one of a trigger switch for capturing an image of the syringe 25, an inspection request switch to the inspector, and an exposure state selection switch for changing the exposure state of the exposure unit 22.

The first communicating unit 32 is an example of a device for allowing the worker to ask or make a request to the inspector. The worker can ask or make a request to the inspector in the inspection room 28 by voice through the first communicating unit 32 and a second communicating unit 33 in the inspection room 28, and can thereby exchange information with the inspector. Such information exchange by voice is also managed by the server 24 through the first control unit 30 and the second control unit 34. The first communicating unit 32 is an example of a voice communicating unit on the preparation side, and the second communicating unit 33 is an example of a voice communicating unit on the inspection side.

In the inspection room 28, there are arranged the second communicating unit 33, the second control unit 34, a second input unit 37, and a second display unit 38. The second input unit 37 is an example of an input unit on the inspection side, and the second display unit 38 is an example of a display unit on the inspection side. The second communicating unit 33, the second control unit 34, the second input unit 37, and the second display unit 38 constitute an example of an inspection confirmation device 52. The inspection confirmation device 52 includes at least the second control unit 34 and the second display unit 38. The inspector can perform the inspection work regarding the mixed injection of the drug solution 25b from the inspection room 28 as a separate room from the workroom 27 based on the image captured by the imaging unit 21. Similarly, in the inspection room 28, by using the second input unit 37 and the second display unit 38 which are controlled by the second control unit 34, the inspector can observe contents of the mixed injection work of the worker in real time or promptly issue an appropriate instruction to the worker.

Moreover, based on drug information of the drug solution 25b stored in the preparation DB 24a, the drug solution inspection system 20 of the first embodiment captures the image of the syringe 25 while changing the exposure state of the exposure unit 22, and inspects a drug amount of the drug solution 25b in the syringe 25. The drug information of the drug solution 25b is, for example, component information such as photodegradability of the drug solution 25b, or color information numerically converted as a density value or a color value of the drug solution 25b. For example, in the case where a photodegradable component (vitamin or the like) is contained in the drug solution 25b, from a viewpoint of a wavelength of light, infrared light is used as illumination light from the light source 22d of the exposure unit 22. Moreover, for example, in response to the density value or the color value of the drug solution 25b, exposure intensity (for example, three types of exposure intensity, i.e., strong, middle, and weak) or a lighting pattern of the exposure unit 22 is changed, whereby the boundary between the gasket 25a (refer to FIG. 2) of the syringe 25 and the drug solution 25b can be made clear. In order to change the lighting pattern, for example, an exposure time may be shortened to obtain a blinking state. Note that at least the color information is necessary as the drug information.

If the type of the drug solution 25b is already known in advance, it is also possible to automatically perform the adjustment of the exposure state of the exposure unit 22 (that is, the adjustment of the exposure intensity and the lighting pattern) based on an imaging result of the drug solution 25b and an association table between the previously stored imaging result and exposure state. Furthermore, if the drug information of the drug solution 25b is present, it is also possible to automatically perform the adjustment of the exposure state of the exposure unit 22 based on the drug information of the drug solution 25b as described above. Moreover, an experienced worker is capable of manually performing the adjustment of the exposure state of the exposure unit 22 as described later.

In this manner, according to the drug solution inspection system 20 of the first embodiment, even if the drug solution 25b has a dark color, the gasket 25a of the syringe 25 which does not transmit light therethrough and the drug solution 25b with a dark color which transmits light therethrough are not assimilated with each other chromatically, and the boundary between the gasket 25a of the syringe 25 and the drug solution 25b can be made clear. That is, the drug solution inspection system 20 of the first embodiment makes it possible to reliably read a scale position of the gasket 25a, and an accurate drug amount can be grasped and accurate visual inspection can be performed even in a state where the captured image is interposed.

As described in the first embodiment, the drug solution inspection system 20 of the first embodiment is particularly effective in the case of inspecting the drug amount of the drug solution 25b in the syringe 25 remotely while interposing the image captured by the imaging unit 21. This is because, in general, in the image captured by the imaging unit 21, the boundary between the drug solution 25b with a dark color and the gasket 25a of the syringe 25 become more difficult to observe than in the case of visual observation.

Next, a description is made of basic operations of the drug solution inspection system 20 of the first embodiment.

In the drug solution inspection system 20 of the first embodiment shown in FIG. 1, the drug container (not shown) which contains the drug solution 25b and the syringe 25 for performing the mixed injection for the drug solution 25b are arranged inside the safety cabinet 26 in the workroom 27, and are isolated from the external air. The safety cabinet 26 is used in the event of handling a dangerous drug such as an anticancer drug. The safety cabinet 26 sets an inner space thereof to a negative pressure state by controlling a flow of air, and prevents leakage of internal gas to the outside. The worker enters the workroom 27, inserts both hands into opening portions (not shown) located in front of the safety cabinet 26, and performs the mixed injection work. Here, if such series of mixed injection work can be clearly grasped as image information or the like to the extent of enabling the inspection, the inspector can carry out the inspection safely and efficiently, for example, in another room such as the inspection room 28 away from the workroom 27 as shown in FIG. 1.

Figure 8A:
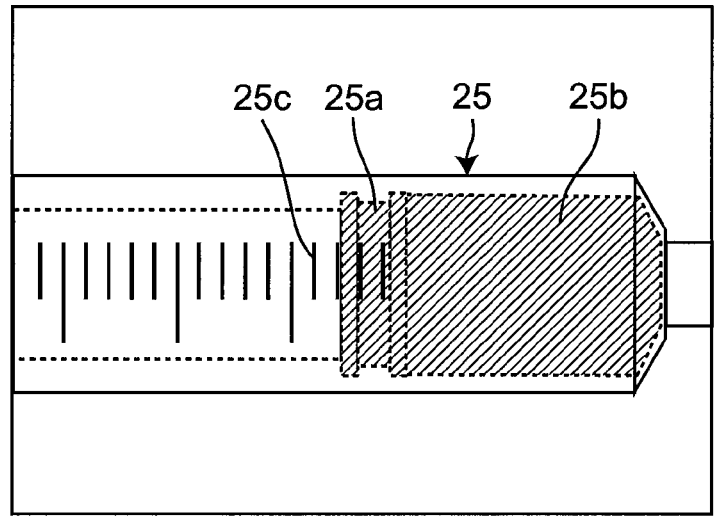
FIG. 8A is a view showing a state where an image of the syringe is captured when there is no exposure from the exposure unit of the drug solution inspection device.
Figure 8B:
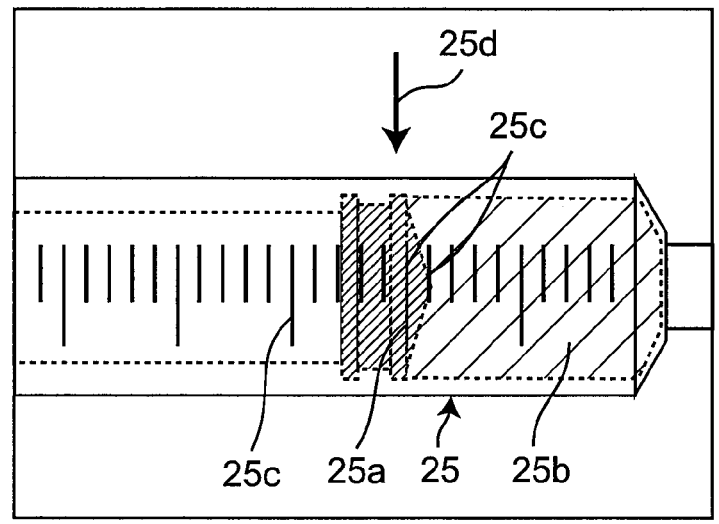
FIG. 8B is a view showing a state where an image of the syringe is captured when there is an exposure from the exposure unit of the drug solution inspection device.

FIG. 8A and FIG. 8B are views showing cases where an image of the syringe 25 is captured by the imaging unit 21 of the drug solution inspection system 20 according to the first embodiment of the present invention. FIG. 8A is a view showing an image of the syringe 25 in a state where there is no exposure from the exposure unit 22. FIG. 8B is a view showing an image of the syringe 25 in a state where the light source 22d of the exposure unit 22 is turned on and there is exposure from the exposure unit 22 (that is, a state where the syringe 25 is exposed from a back surface thereof).

In the case where there is no exposure from the exposure unit 22, it is found that, as shown in FIG. 8A, the color of the drug solution 25b and the color of the scale 25c and gasket 25a of the syringe 25 are assimilated with each other, and it is difficult to determine the positions of the gasket 25a and the scale 25c.

Meanwhile, in the case where there is exposure from the exposure unit 22, it is found that, as shown in FIG. 8B, the apparent color of the drug solution 25b is changed by transmitted light of the exposure unit 22, which comes from the back surface of the syringe 25, and visibility of a reading position of the scale 25c in the vicinity of the gasket 25a is enhanced. Accordingly, the inspector can read the scale 25c at a position indicated by an arrow 25d of FIG. 8B also from the captured image, and can inspect the drug amount of the syringe 25.

In order to further enhance the visibility of the reading position of the scale 25c, an exposure amount of the exposure unit 22 may be changed according to the color information of the drug solution 25b in the syringe 25. Specifically, the color information of the drug solution 25b is numerically converted as the density value or the color value of the drug solution 25b, is stored in advance as drug color information in the preparation DB 24a, and is read out from the server 24 by the first control unit 30 as necessary. Then, the exposure amount and the like of the exposure unit 22 are changed by the first control unit 30 based on this information, whereby inspection capable of more accurately identifying the boundary in response to a plurality of types of drugs can be performed. As described above, the density value or the color value of the drug solution 25b is stored in advance in the preparation DB 24a as the drug color information, and based on this drug color information, a quantity (exposure amount), brightness, or wavelength of the light from the exposure unit 22 is changed by the first control unit 30, whereby inspection for amounts of the drug solutions corresponding to a plurality of types of drugs can be carried out.

As shown in FIG. 3, with regard to an irradiation position of the light from the exposure unit 22, the light only needs to be radiated onto a position including at least a part of the gasket 25a of the syringe 25. This is because, since a shape of the gasket 25a of the syringe 25 is predetermined in general, it is possible for the inspector to carry out the inspection by assuming the position of the gasket 25a and the drug amount if a part of the gasket 25a can be identified. However, in order to inspect the drug amount more accurately, the light from the exposure unit 22 is desirably radiated onto a region including the entire gasket 25a and having a width substantially equal to the width of the syringe 25, as shown in FIG. 8B. In the first embodiment, the light from the exposure unit 22 is radiated onto the region having a width substantially equal to the width of the syringe 25, whereby the light can be radiated from the opening portion 50d such that unnecessary light does not enter the imaging unit 21, and the visibility of the cylinder 25f can be enhanced.

The exposure unit 22 may be configured to establish at least any state of a lighting state, a multi-stage illuminance state, and a contrast pattern state by the control in the first control unit 30. In the lighting state, the entire syringe 25 is exposed, and therefore, the visibility of the reading position of the scale 25c of the syringe 25 can be enhanced. Moreover, in the multi-stage illuminance state, in a process where the exposure state is gradually brightened (or gradually darkened), the visibility of the reading position of the scale 25c of the syringe 25 can be enhanced without depending on the color information of the drug solution 25b. Furthermore, in the contrast pattern state, unnecessary light does not enter the imaging unit 21 as described later, and the imaging unit 21 is capable of fine gain adjustment corresponding to the color information of the drug solution 25b in the syringe 25, and the visibility of the reading position of the scale 25c can be enhanced.

Figure 9:
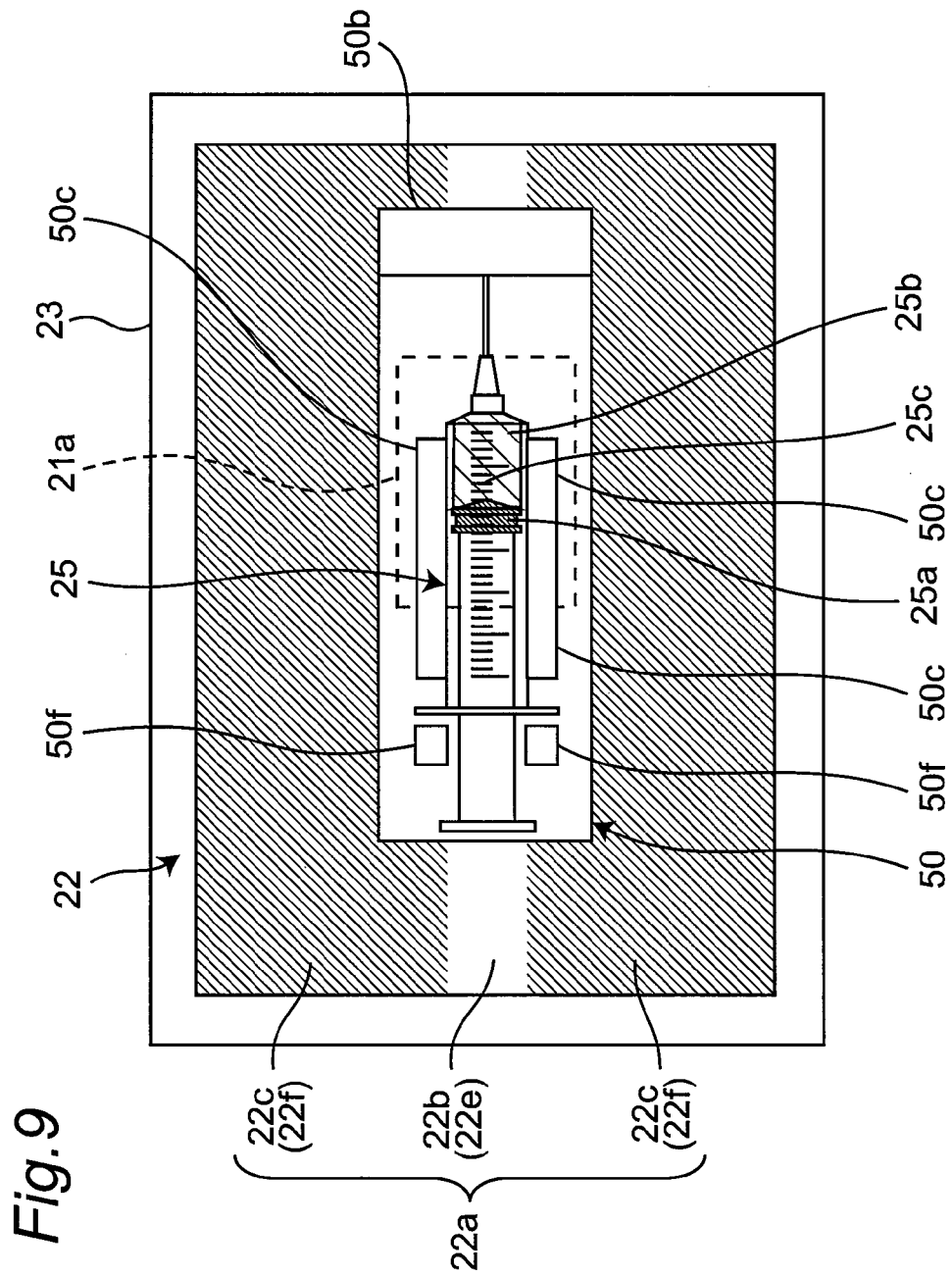
FIG. 9 is a plan view of a case of observing the syringe while changing an exposure state of the exposure unit of the drug solution inspection system according to the first embodiment of the present invention to a contrast pattern state.

FIG. 9 is a plan view of a case of observing the syringe 25 while changing the exposure state of the exposure unit 22 of the drug solution inspection system 20 according to the first embodiment of the present invention to a contrast pattern state. That is, FIG. 9 is a view for explaining the second feature of the first embodiment.

As shown in FIG. 9, the exposure unit 22 incorporated in the inspection base 23 performs exposure on the syringe 25 held on the pair of side portions 50c of the jig 50, from the back surface of the syringe 25, through the opening portion 50d of the jig 50. As shown in FIG. 9, as an example, a light emitting surface 22a of the light source 22d of the exposure unit 22 in the first embodiment has a region wider than the syringe 25.

In the first embodiment, on the light emitting surface 22a of the exposure unit 22, the light emitting portion 22b in the vicinity of the syringe 25 and extinguished portions 22c adjacent thereto are provided. For example, the light emitting portion 22b is the light transmitting region 22e described above, and the extinguished portions 22c are the light shielding covers 22f described above. Hence, the illumination from the light source 22d is shielded by the extinguished portions 22c (light shielding covers 22f), but transmits through the light emitting portion 22b (light transmitting region 22e) such that only the vicinity of the syringe 25 is exposed. In this manner, unnecessary light does not enter the imaging unit 21 that captures an imaging range 21a surrounded by a broken line, and the imaging unit 21 can carry out the fine gain adjustment corresponding to the color information of the drug solution 25b in the syringe 25. Hence, as shown in FIG. 9, only the vicinity of the syringe 25 is exposed by the light emitting portion 22b, whereby the visibility of the reading position of the scale 25c can be enhanced, and accordingly, it is possible to more reliably read the position of the gasket 25a and grasp the accurate amount of the drug solution 25b to thereby perform accurate visual inspection. Here, the exposure of only the vicinity of the syringe 25 is, as shown in FIG. 9, exposure of only a region, i.e., the light emitting portion 22b (light transmitting region 22e), which has a width substantially equal to that of the cylinder 25f of the syringe 25 and includes at least the cylinder 25f of the syringe 25.

Figure 10:
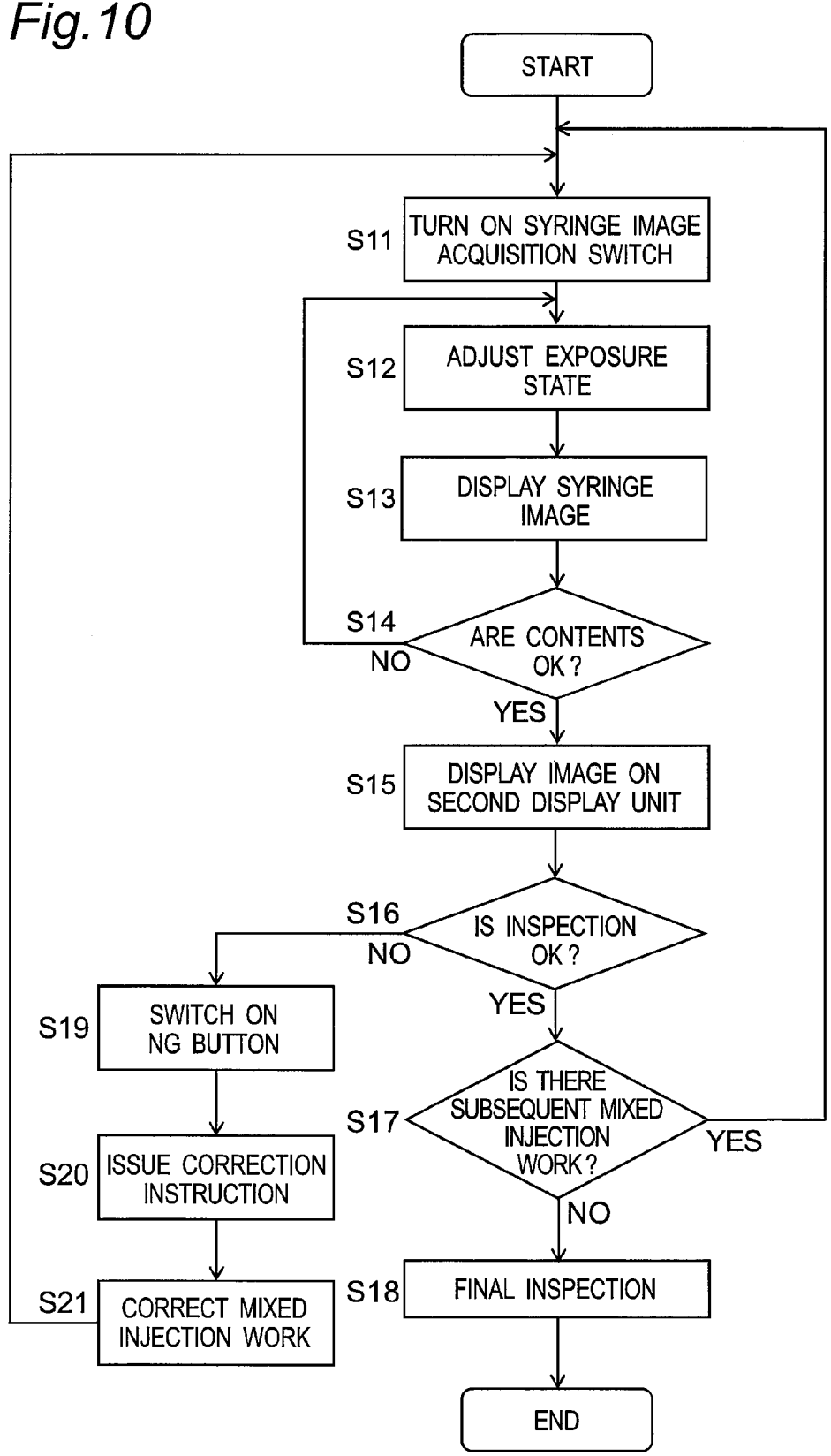
FIG. 10 is a flowchart of preparation and inspection of an injection drug, which are carried out by using the drug solution inspection system according to the first embodiment of the present invention.

Next, a description is made of a flow of preparation and inspection of the drug solution with reference to FIG. 10.

FIG. 10 is a view showing an example of a flowchart of preparation work and inspection work for the drug solution, which is carried out by using the drug solution inspection system 20 according to the first embodiment of the present invention.

As shown in FIG. 10, when starting the mixed injection of the drug solution, firstly, the worker turns on a switch for acquiring the image of the syringe 25 on the first input unit 31 (step S11).

Then, based on at least one of the component information and color information of the drug solution 25b which is stored in the preparation DB 24a of the server 24, the first control unit 30 performs the adjustment of the exposure state of the exposure unit 22 such that the positions of the gasket 25a and the scale 25c can be clearly determined (step S12). Here, the adjustment of the exposure state may be performed automatically by the first control unit 30, or may be performed manually by the worker. In the case where the adjustment is performed manually by the worker, there are exemplified work of exchanging the jig 50; and work of exchanging the light shielding covers 22f with those in which the width of the light transmitting region 22e is substantially equal to the width of the syringe 25. In the case where the adjustment is performed automatically by the first control unit 30, the first control unit 30 controls operations of the elements which emit light in the light emitting portion 22b, such that the width of the light emitting portion 22b becomes substantially equal to the width of the syringe 25.

Subsequently, the image of the exposed syringe 25 is captured by the imaging unit 21 and then displayed on the first display unit 36 by the first control unit 30 (step S13).

Subsequently, the worker confirms the image on the first display unit 36, and confirms contents of the exposure (step S14). Here, in the case where the worker determines that the exposure is insufficient or excessive (No in step S14), the process returns to step S12, and the exposure state is adjusted by an exposure state selection switch (not shown) or the like of the first input unit 31.

In the case where the exposure is optimized by the automatic adjustment or manual adjustment of the exposure, and the reading position of the scale 25c of the gasket 25a can be clearly determined (Yes in step S14), the worker switches on an inspection start button on the first input unit 31 for making an inspection request to the inspector. Then, in order to inspect the amount of the drug solution 25b in the syringe 25, the information of the captured image of the syringe 25 is transmitted from the first control unit 30 to the second control unit 34. When the information is transmitted to the second control unit 34, the image of the syringe 25 is displayed on the second display unit 38 by the second control unit 34 (step S15).

Then, the inspector reads the amount of the drug solution 25b in the syringe 25 from the image of the syringe 25 displayed on the first display unit 36, and determines whether the inspection for the mixed injection of the drug solution 25b is OK or NG (step S16).

Here, in the case where the inspector determines that the inspection result of the mixed injection of the drug solution 25b is OK (Yes in step S15), the inspector switches on an approval button on the second input unit 37. Thereafter, the inspector determines whether or not there is subsequent mixed injection work to be performed next (step S17).

Then, if there is subsequent mixed injection work to be performed next (Yes in step S17), the process returns to the point before step S11 which is the point of starting time, and repeat the mixed injection work and the inspection work which are similar to the previous steps for another mixed injection work from step S11. On the other hand, if there is no subsequent mixed injection work for the drug solution 25b, the inspector carries out final inspection of performing the overall inspection and putting an electronic seal of approval (step S18), and ends the mixed injection of the drug solution.

However, if the inspector determines that the inspection cannot be carried out or the inspection result is NG, for example, due to the reason that the amount of the drug solution 25b cannot be read or the amount of the drug solution 25b is wrong (No in step S16), the inspector switches on an NG button on the second input unit 37 (step S19). Then, the inspector issues a correction instruction to the worker by the second input unit 37 (step S20). For example, based on information inputted from the second input unit 37, this correction instruction is displayed on the first display unit 36 by the control of the second control unit 34 and the first control unit 30. The worker corrects the work based on contents of the correction instruction displayed on the first display unit 36 (step S21), and along the contents of such correction, similar mixed injection work and inspection work are repeated from step S11. That is, the process returns from step S21 to step S11.

Through the series of work described above, the inspector can grasp the accurate amount of the drug solution 25b and carry out the accurate inspection while being at the place away from the workroom 27. Accordingly, the inspection can be carried out safely and efficiently without applying a load on the inspector.

Figure 11:
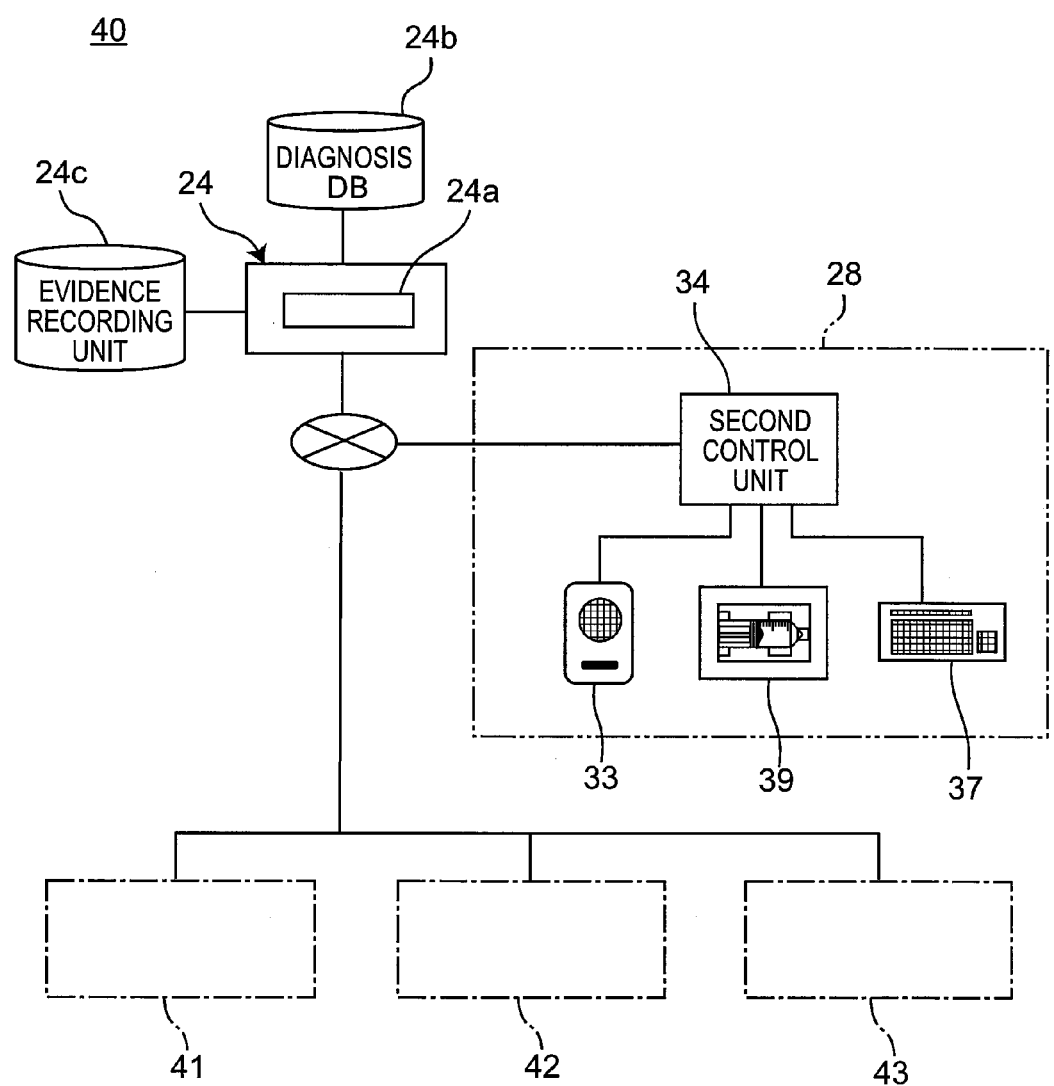
FIG. 11 is a schematic configuration view of a drug solution inspection system of another mode according to the first embodiment of the present invention.
Figure 12:
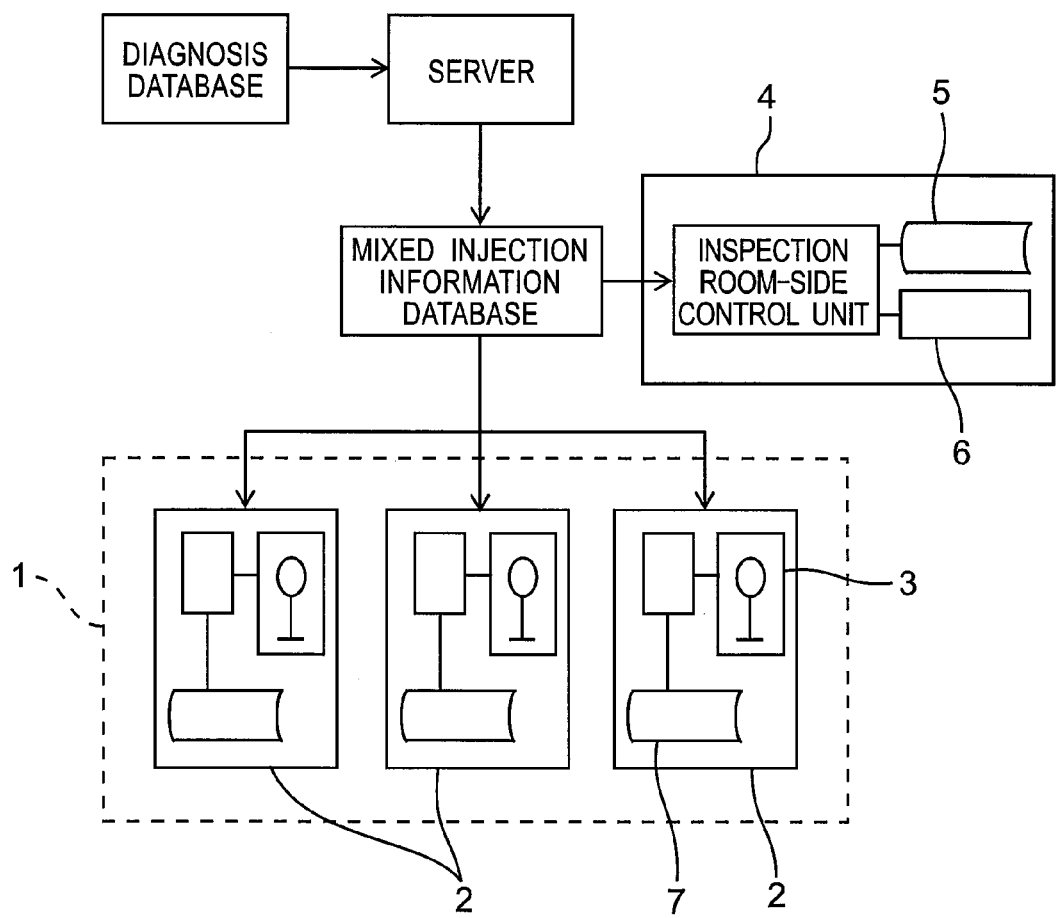
FIG. 12 is a configuration view of a mixed injection inspection system of JP 2007-260390 A.

FIG. 11 is a configuration view showing a schematic configuration of a drug solution inspection system 40 according to another mode of the first embodiment of the present invention. The drug solution inspection system 40 shown in FIG. 11 is different from the drug solution inspection system 20 shown in FIG. 1 in that a plurality of workrooms 41, 42 and 43 are provided, an imaging unit (not shown) and an exposure unit (not shown) are arranged in each of the workrooms 41, 42 and 43, and pluralities of imaging units and exposure units are provided as a whole. For example, the workrooms 41, 42 and 43 are clean rooms. In FIG. 11, an internal configuration of each of the workrooms 41, 42 and 43 has the same structure as that of the workroom 27 in the embodiment described above, and accordingly, a detailed description thereof is omitted.

As shown in FIG. 11, the drug solution inspection system 40 in another mode of the first embodiment includes a server 24 which manages a preparation DB 24a regarding the respective drug solutions 25b in the respective mixed injection work and inspection work in the workrooms 41, 42 and 43. Then, in each of the workrooms 41, 42 and 43, the drug solution inspection system 40 in another mode of the first embodiment captures an image of the syringe while changing the exposure state of the exposure unit by the first control unit 30, and enables the inspector to inspect the amount of the drug solution 25b. In this manner, in one inspection room, the inspector can efficiently carry out the inspection sequentially for all of the plurality of mixed injection work steps. Hence, the inspector can carry out the inspection without sequentially moving to the respective workrooms.

In accordance with the above-described embodiments of the present invention, even if the drug solution has a dark color, a contrivance is made to the illumination for exposure on the syringe 25, whereby the boundary between the gasket 25a of the syringe 25 and the drug solution 25b can be made clear, the position of the gasket 25a can be reliably read, the accurate amount of the drug solution can be grasped, and the accurate inspection can be carried out.

Note that arbitrary embodiments or modes among various embodiments or modes described above are combined with one another as appropriate, whereby effects inherent in the respective embodiments or modes can be obtained.

The drug solution inspection device and drug solution inspection method of the present invention are capable of performing accurate inspection based on the accurate amount of the drug solution, even if the drug solution has a dark color, and for example, are useful in performing the mixed injection work and the inspection work at different places in a hospital.

The entire disclosure of Japanese Patent Applications Nos. 2012-142638 and 2013-110878 filed on Jun. 26, 2012 and May 27, 2013, including specification, claims, drawings, and summary are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A drug solution inspection device for inspecting an amount of a drug solution in a syringe, the device comprising:
a light source that performs exposure on the syringe mounted on a jig having a transmitting portion;
an imager that captures an image of the syringe exposed by the light source through the transmitting portion; and
a controller that controls the imager and the light source to acquire inspection information of the drug solution,
wherein the controller that controls the light source to change an exposure state of the light source based on drug solution color information regarding the drug solution in the syringe.

2. The drug solution inspection device according to claim 1, wherein a width of the transmitting portion is substantially equal to a width of a cylinder of the syringe mounted on the jig.

3. The drug solution inspection device according to claim 1, wherein a width and a length of the transmitting portion are substantially equal to a width and a length, respectively, of a cylinder of the syringe mounted on the jig.

4. The drug solution inspection device according to claim 1, further comprising:
a transparent member that is arranged in the transmitting portion.

5. The drug solution inspection device according to claim 1, wherein the light source has a linear band-shaped recess at a center thereof, and
the jig has a linear band-shaped protrusion at a bottom portion of the jig, and the protrusion engages with the recess.

6. The drug solution inspection device according to claim 1, wherein the jig is one of a plurality of jigs having different transmitting portion widths, the plurality of jigs corresponding to a plurality of syringes having different cylinder widths.

7. The drug solution inspection device according to claim 1, wherein the controller controls the light source to expose a region including at least a gasket of the syringe.

8. The drug solution inspection device according to claim 1, further comprising:
a safety cabinet in which the imager, the light source, and the jig are arranged.

9. The drug solution inspection device according to claim 8, further comprising:
a display inside the safety cabinet, the display displaying an inspection instruction or an inspection result from an inspector.

10. The drug solution inspection device according to claim 1, further comprising:
an identifier that identifies information of a prescription and a type of the drug solution,
wherein the controller changes the exposure state of the light source based on the information of the prescription and the type of the drug solution identified by the identifier and the image of the syringe captured by the imager.

11. A drug solution inspection system comprising:
the drug solution inspection device according to claim 8; and
an inspection confirmation device that receives inspection information transmitted from the drug solution inspection device to inspect the inspection information, wherein the inspection confirmation device is arranged in an inspection room which is different from a workroom in which the safety cabinet is mounted.

12. A drug solution inspection method in which an amount of a drug solution in a syringe is inspected, the method comprising:
    inspecting the amount of the drug solution in the syringe using the drug solution inspection device according to claim 1.

* * * * *